(12) United States Patent
Absillis

(10) Patent No.: US 7,894,437 B2
(45) Date of Patent: Feb. 22, 2011

(54) DETERMINING TRANSMISSION PORT IN A GPON NETWORK

(75) Inventor: Luc Absillis, Raleigh, NC (US)

(73) Assignee: Alcatel Lucent, Paris (FR)

( * ) Notice: Subject to any disclaimer, the term of this patent is extended or adjusted under 35 U.S.C. 154(b) by 196 days.

(21) Appl. No.: 11/967,166

(22) Filed: Dec. 29, 2007

(65) Prior Publication Data

US 2009/0169207 A1   Jul. 2, 2009

(51) Int. Cl.
*H04L 12/28*   (2006.01)

(52) U.S. Cl. ...................................... 370/392

(58) Field of Classification Search ........................ None
See application file for complete search history.

(56) References Cited

U.S. PATENT DOCUMENTS

| 2006/0067321 | A1* | 3/2006 | Satou .......................... 370/392 |
| 2007/0201486 | A1* | 8/2007 | Solomon et al. ........ 370/395.51 |
| 2007/0201872 | A1* | 8/2007 | Yim et al. ...................... 398/66 |
| 2008/0294755 | A1* | 11/2008 | Melsen et al. ............... 709/220 |

\* cited by examiner

*Primary Examiner*—Chirag G Shah
*Assistant Examiner*—Otis L Thompson, Jr.
(74) *Attorney, Agent, or Firm*—RG & Associates

(57) ABSTRACT

In a VLAN per service architecture, an ONT of a GPON network operating in an untrusted mode produces a service selection filter from a DHCP message sent from a particular VLAN. The service filter may be dependent on the CPE address and/or the destination address, and is used to select a port-id for upstream transmission of data from the ONT.

19 Claims, 3 Drawing Sheets

US 7,894,437 B2

DETERMINING TRANSMISSION PORT IN A GPON NETWORK

FIELD OF THE INVENTION

This invention relates to passive optical networks and in particular to transmission of data on ports of a passive optical network.

BACKGROUND OF THE INVENTION

A Gigabit Passive Optical Network (GPON) can be configured in a number of ways, including a Virtual Local Area Network (VLAN) per service configuration and a VLAN per subscriber configuration. A typical implementation of a VLAN per service model 10 is illustrated in FIG. 1. The network 10 includes one or more Optical Line Terminations (OLT) 11 and one or more Optical Network Terminations (ONT) 12 (also termed an Optical Network Unit (ONU)) connected through fiber 13 to the OLTs 11. The ONTs 12 interface with Customer Premises Equipment (CPE) 14 through a User/Network Interface (UNI) 15. The CPE 14 may be any of a number of communications devices including telephone, mobile telephone, WAP enabled devices, computer terminals, routers, and any equivalents thereof. In a VLAN per service configuration, a VLAN per service is configured on a network interface of the OLT 11. In the OLT 11 data from multiple ONT User/Network Interface (UNI) ports 15 is bridged onto the per service VLANs through one or more virtual bridging instances 16. In the present example, a VLAN for data 17, Voice over IP (VOIP) 18 and video 19 are shown, though it will be apparent to the person skilled in the art that other VLANs can be provided for additional services. Since a data UNI port 15 of the ONT 12 can support multiple services a service selection function needs to make sure that data from different services is separated by the ONT 12 and sent to the OLT 11 on the fiber 13 in the Port-ID (or group of port-ID's) associated with that service. For clarity, the ONTs shown in FIG. 1 Error! Reference source not found. are illustrated with a single data UNI port 15, though it will be apparent to the person skilled in the art that the ONTs can have multiple data UNI ports, in which case each data UNI port on that ONT is treated as its own entity.

A data UNI port on an ONT can be deployed in trusted or untrusted mode. In trusted mode the VLAN and p-bit markings and VLAN-id received on the data UNI port are consider correct and are retained. The ONT can select a port-id based on the received p-bit and this port-id is mapped by the OLT to one of the defined service bridges. In short the service selection is determined by the CPE marking.

In untrusted mode the ONT strips the VLAN tag (both VLAN-id and p-bits) received from the CPE 14 and generates the VLAN-tag towards the VLAN based on configured or default parameters for all the traffic received. In other words in untrusted mode all data on a data-UNI port is considered part of a single service.

To implement the VLAN per service model for untrusted data UNI ports the ONT needs to perform a service selection function. In some Broadband Passive Optical Networks (BPON) this problem was solved by using a single self learning bridging instance in the ONT for all services and relying on selection of the service based on the learned MAC address of the service edge router. Although this is a workable solution it does have some major drawbacks. In the learning bridge model broadcast messages and unknown destination messages are flooded on all service VLANS, and are forwarded to all service providers. Because of this lack of full separation of traffic, the solution only works if all involved network elements and servers can be fully trusted and are correctly configured. One of the biggest benefits of the self-learning bridge approach is that no on-the-fly configuration for service selection filters is needed.

In many GPON ONTs, the self learning bridging function is not available. An alternative solution is therefore to configure the ONT with service selection filters which can provide the correct and full traffic separation that is needed. However, in many GPON deployments the ONT is fully managed by the OLT through a standardized GPON management protocol OMCI. To introduce configuration of the service selection filters either extensions to OMCI need to be introduced or another management interface to the ONT needs to be provided.

Therefore what is required is a system, method and computer readable medium that can provide service selection for a GPON ONT running in untrusted mode.

SUMMARY OF THE INVENTION

In accordance with one embodiment of the disclosure, there is provided a method for operating an ONT in a GPON architecture, the method including receiving a DHCP response message; processing said response message to produce a service filter; and applying said service filter to determine a port-id for at least one upstream data transmission.

In accordance with one embodiment of the disclosure, there is provided a gigabit passive optical network including at least one optical line termination; at least one optical network termination in communication with said at least one optical line communication through a plurality of ports; and at least one virtual local area network; wherein the at least one optical network termination includes at least one filter for determining a port on which to provide a transmission to said at least one optical line termination, said at least one filter being created from a DHCP message produced by the at least one virtual local area network.

In accordance with one embodiment of the disclosure, there is provided a computer readable medium comprising at least one set of instructions executable on at least one processor, the at least one set of instructions including instructions for receiving a DHCP response message; processing said response message to produce a service filter; and applying said service filter to determine a port-id for at least one upstream data transmission.

BRIEF DESCRIPTION OF THE DRAWINGS

Embodiments of the disclosure will now be described, by way of example only, with reference to the accompanying drawings in which.

DETAILED DESCRIPTION OF THE INVENTION

Figure 1:
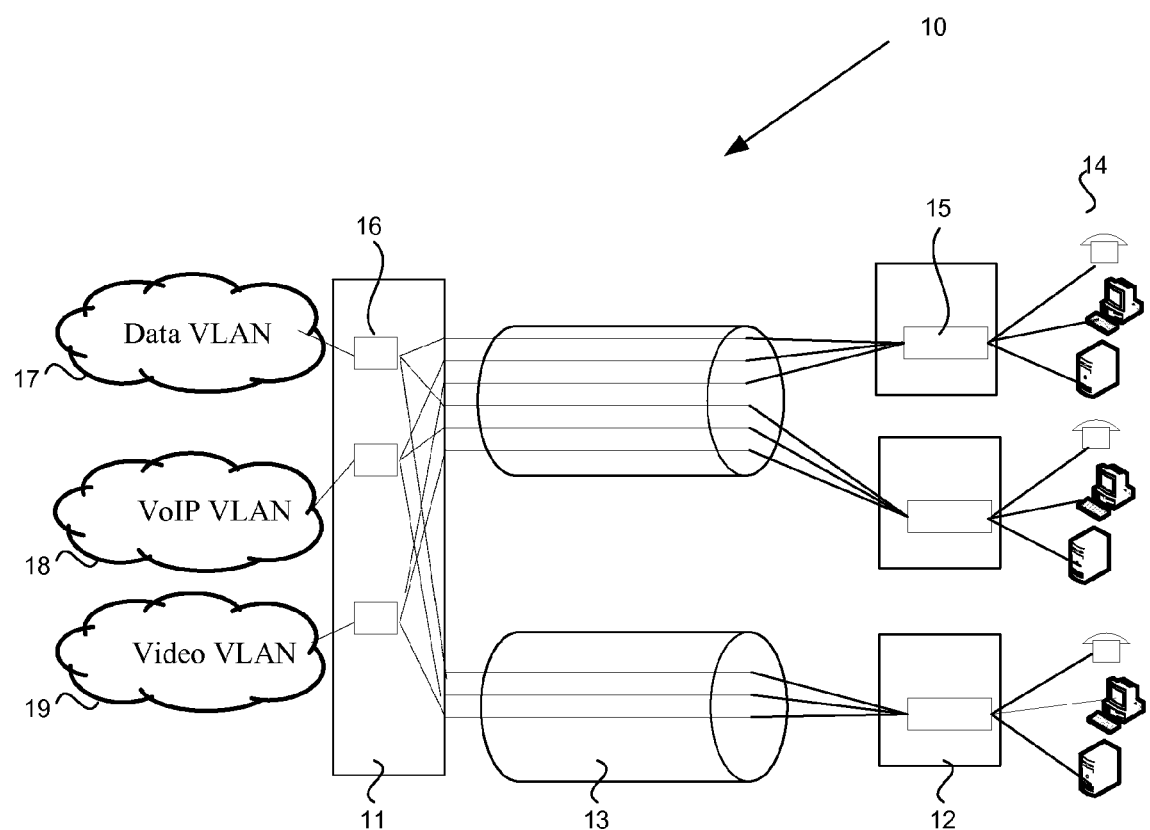
FIG. 1 is a schematic representation of a GPON.
Figure 2:
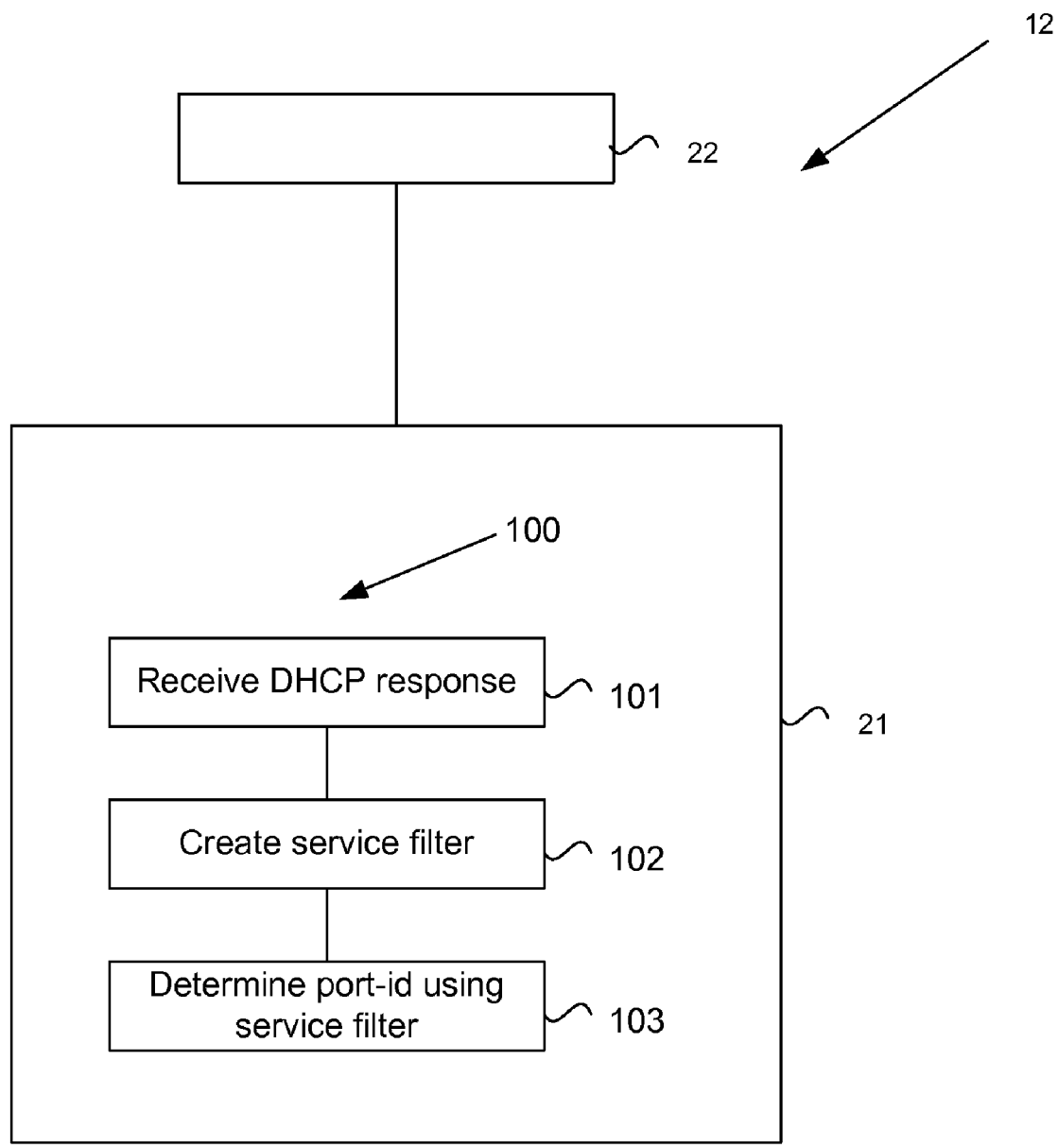
FIG. 2 is a schematic representation of an ONT and a method performed in a processor of the ONT.

An ONT 12 forming part of the network 10 illustrated in FIG. 1 is shown in FIG. 2. The ONT 12 includes at least one processor 21 in operative association with at least one memory 22. The memory 22 includes a memory storing a set of instructions executable by the processor 21.

The hardware capabilities exist in known ONTs to create filters that can allow service selection on Layer 3 fields (e.g.

IP source and destination address field) or even layer 4 fields (e.g. TCP/UDP port numbers). The problem with using these filters as service selection criteria is configuration. Dynamically changing the configuration of the ONT for UNI data services is cumbersome and requires extensions to the OMCI management channel or a proprietary interface towards the ONT to configure these filters.

In order to implement L3/L4 service selection, an automatic configuration mechanism needs to be introduced. In accordance with an embodiment of the disclosure, the ONT 12 uses Dynamic Host Configuration Protocol (DHCP) messages to create the service selection filters. Since for most Layer 3 services a client gets a dynamic or sticky IP address from the service provider through the DHCP protocol, the DHCP messages have all information needed to define the service selection filters.

A method for processing the DHCP messages in the ONT 12 in accordance with an embodiment of the disclosure will now be described with reference to the flowchart 100 of FIG. 2, which is depicted as being performed within the processor 21 of the ONT 12. At step 101, the processor 21 receives a DHCP response message. From the DHCP response message, a service selection filter is produced (step 102). At step 103, the service selection filter is applied to determine an appropriate port on which to transmit data upstream to the OLT 11.

Service selection can be performed in a number of ways. In one embodiment, if the different services that need to be addressable have distinct address range, e.g. public addresses for internet service, a private IP range for video and a private range for data, then service selection can be based on destination network address+netmask, i.e. 1 filter per service. In one embodiment, if multiple services give access to the same address range, e.g. 2 internet service providers with a different IP edge, then the service selection can be based on the source IP address of the device in the home network connecting to one or the other service, i.e. 1 filter per CPE device. Other service filters produced from the DHCP messages may be apparent to the person skilled in the art.

Figure 3:
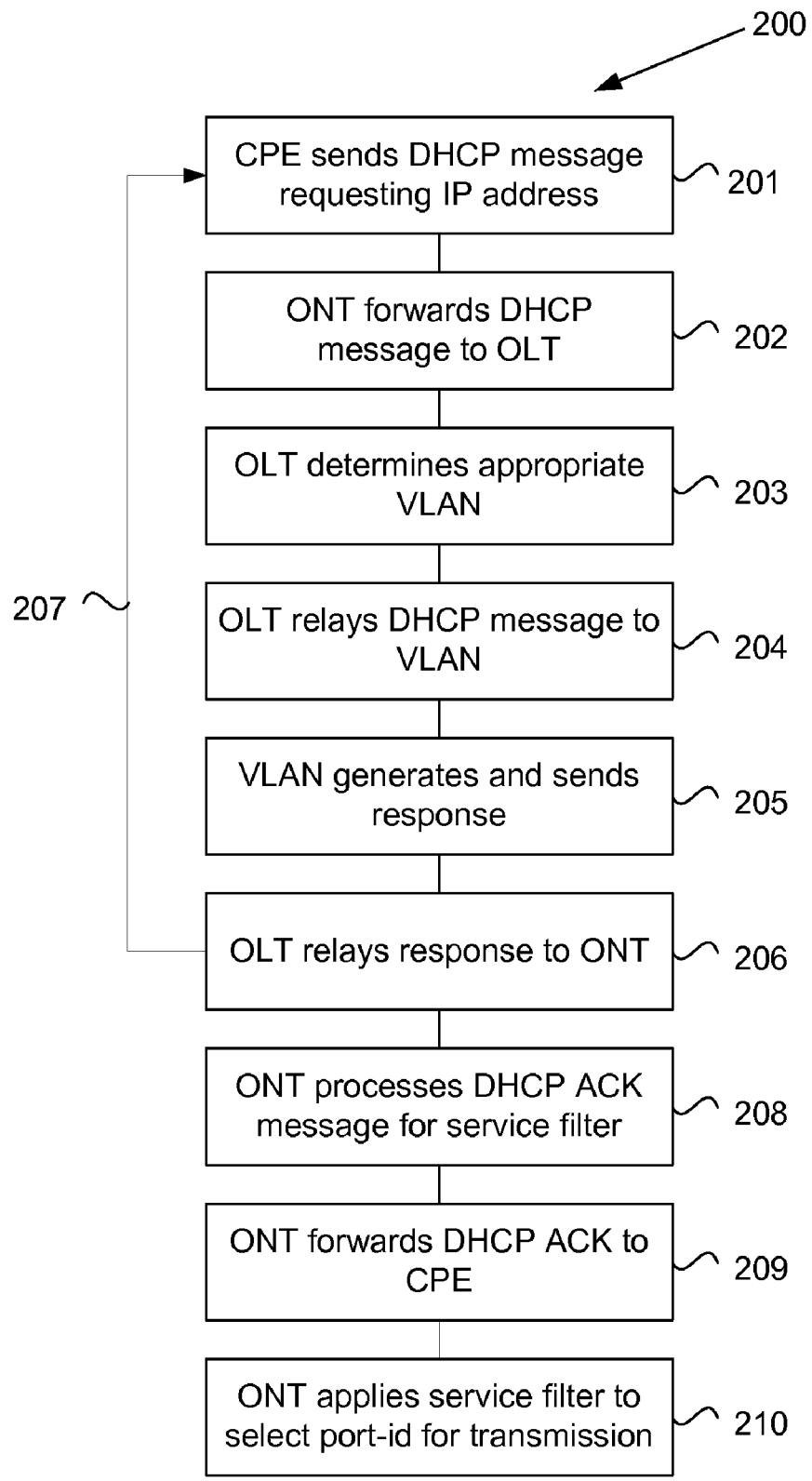
FIG. 3 is a flowchart representing a method performed in accordance with an embodiment of the disclosure.

A more detailed embodiment will now be described with reference to the flow chart 200 of FIG. 3. The flow chart 200 assumes that some pre-provisioning of the network 10 has been performed. This pre-provisioning includes the VLANs 17, 18, 19 on the network interface, the configuration of the bridge per service VLAN 16, the configuration of the services on the ONT 12 and the binding of the ONT services to the service bridge 16 in the OLT 11. In addition, the DHCP relay function in the OLT 11 needs to be able to determine what service the DHCP request is for and forward the DHCP message on the correct service VLAN (either as unicast in case of L3 relay or as multicast in case of L2 relay). The selection of the service VLAN should be based on the same criteria that are commonly used in the DHCP servers to assign an IP address out of the service specific range. The most common criteria include Option 60 information and MAC OUI configuration.

The steps of flowchart 200 assume that all service pre-provisioning has been done and the OLT/ONT/PON are operational. At step 201, the CPE sends a DHCP message to obtain an IP address. The ONT 12 processes the DHCP message and forwards the DHCP request onto OLT (step 202). This can be over a pre-provisioned specific port-id or a service port-id. At step 203, the DHCP relay of the OLT 11 inspects the DHCP message and determines the appropriate service VLAN, e.g. based on the configured option 60, MAC OUI etc. This configuration should be synchronized with the configuration of DHCP servers. The OLT 11 then relays the DHCP message onto the correct service VLAN (step 204) with added information, such as option 82 if needed. The DHCP server on the VLAN generates a response (step 205) to the OLT 11. The OLT DHCP Relay receives the response message from DHCP server on the service VLAN and forwards the response message to the ONT (step 206) on a port-ID associated with the service.

In a typical application, steps 201 to 206 are performed twice, as indicated in the flowchart by arrow 207, one for DHCP discover/DHCP offer and one for DHCP request/DHCP ack message.

At step 208, the ONT 12 processes the DHCP acknowledgement message and creates a service filter from the standard information in the DHCP message. As described above, the service filter may be based on the CPE address as source address or on the network address+subnet mask as the destination. Other forms of filters may be apparent to the person skilled in the art. For example, it is possible to send down much more complex filters to the ONT by using vendor specific fields in the DHCP acknowledgement message. The ONT 12 then forwards the ACK message to the CPE 13 (step 209).

In future upstream transmissions from the CPE 13, the service filters created are applied (step 210) to determine the correct service port-id for transmission from the ONT 12 to the OLT 11.

In order to accurately maintain the service filters that are created, a process to clean-up the filters may be introduced. In one embodiment, the service filter is linked to the lease time from the DHCP so that the service filter will expire when the assigned IP address expires. More complex clean-up mechanisms may be considered by the person skilled in the art without changing the basic functionality proposed in this disclosure.

From the foregoing, it will be apparent to the person skilled in the art that the embodiments described alleviate security and operational concerns of the learning bridge model. In addition, the embodiments remove the configuration complexity out of using Layer 3 filters for service selection.

While the embodiments herein described have provided particular application to a VLAN per service model, it is considered that the methodology can be provided to other models where service selection filters are required, such as a VLAN per subscriber model where service selection is needed for CoS purposes only. Further, other tunneling mechanisms or protocols can be used with the present invention including IP security (IPsec), Generic Routing Encapsulation (GRE), IP in IP, and Multi-Protocol Label Switching (MPLS).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules may be sent between the modules via at least one of a data network, the Internet, an Internet Protocol network, a wireless source, and a wired source and via a plurality of protocols.

What is claimed is:

1. A method for operating an ONT in a GPON architecture, the method including:
   receiving a DHCP response message;
   processing said response message comprising:
      determining a port-id identified in the DHCP response message; and
      determining an upstream transmission port-id from the port-id identified in the DHCP response message;
   generating a service filter that associates the upstream transmission port-id with at least one address;
   applying said service filter to an upstream transmission comprising:
      determining an address identified in the upstream transmission; and
      determining an upstream port-id associated with the identified address; and
   transmitting the upstream transmission on a port identified by the upstream port-id.

2. The method according to claim 1 wherein processing said response message includes determining at least one of a source address and a destination address and wherein said filter is dependent on at least one of a determined source address or a determined destination address.

3. The method according to claim 2 wherein the destination address includes a network address and subnet mask and the filter is dependent on said network address and subnet mask.

4. The method according to claim 2 wherein the source address includes a CPE address.

5. The method according to claim 1 wherein producing said service filter includes associating a virtual local area network with an address identified in said DHCP response message.

6. The method according to claim 5 wherein applying said filter includes determining an address in said at least one upstream data transmission and determining a virtual local area network associated with said address.

7. The method according to claim 1 wherein the method is deployed in at least one of a following per service architecture:
   VLAN;
   IPsec;
   GRE;
   IP in IP; and
   MPLS.

8. The method according to claim 1 wherein the method is deployed in at least one of a following per subscriber architecture:
   VLAN;
   IPsec;
   GRE;
   IP in IP; and
   MPLS.

9. The method according to claim 1 wherein processing the DHCP response message is performed in an optical network termination.

10. The method according to claim 1 wherein an expiration of a service filter is linked to an expiration of an IP address provided in said DHCP response message.

11. A gigabit passive optical network including:
    at least one optical line termination;
    at least one optical network termination in communication with said at least one optical line communication through a plurality of ports; and
    at least one virtual local area network;
    wherein the at least one optical network termination includes at least one filter for determining an upstream port-id on which to provide an upstream transmission to said at least one optical line termination, said at least one filter being created by determining the upstream port-id from a port-id identified in a DHCP message produced by the at least one virtual local area network, said at least one filter used to determine a destination address of the upstream transmission, and used to further determine an upstream port-id associated with the identified upstream address and transmit the upstream transmission on a port identified by the upstream port-id.

12. The optical network according to claim 11 including at least one virtual local area network per service.

13. The optical network according to claim 11 wherein the at least one optical network termination is configured to process said DHCP message to produce said at least one filter automatically.

14. A non-transitory computer readable storage medium comprising at least one set of instructions executable on at least one processor, the at least one set of instructions including instructions for:
    receiving a DHCP response message;
    processing said response message comprising:
       determining a port-id identified in the DHCP response message, and determining an upstream transmission port-id from the port-id identified in the DHCP response message
    generating a service filter that associates the upstream transmission port-id with at least one address;
    applying said service filter to an upstream transmission comprising:
       determining an address identified in the upstream transmission, and
       determining an upstream port-id associated with the identified address, and
    transmitting the upstream transmission on a port identified by the upstream port-id.

15. The non-transitory computer readable storage medium according to claim 14 including instructions for determining the destination address.

16. The non-transitory computer readable storage medium according to claim 15 wherein the destination address includes a network address and subnet mask.

17. The non-transitory computer readable storage medium according to claim 14 including instructions for associating a virtual local area network with an address identified in said DHCP response message.

18. The non-transitory computer readable storage medium according to claim 17 including instructions for determining an address in said at least one upstream data transmission and determining a virtual local area network associated with said address.

19. The non-transitory computer readable storage medium according to claim 14 wherein the instructions are executable on at least one processor of an optical termination unit of a gigabit passive optical network.

* * * * *